(12) United States Patent
Chakraborty

(10) Patent No.: US 9,250,640 B1
(45) Date of Patent: Feb. 2, 2016

(54) DC-TO-DC CONVERTER CONTROLLERS INCLUDING OSCILLATION PREVENTION SUBSYSTEMS, AND ASSOCIATED SYSTEMS AND METHODS

(71) Applicant: Volterra Semiconductor Corporation, Fremont, CA (US)

(72) Inventor: Sombuddha Chakraborty, Redwood City, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 13 days.

(21) Appl. No.: 13/968,165

(22) Filed: Aug. 15, 2013

(51) Int. Cl.
*H02M 1/12* (2006.01)
*G05F 1/46* (2006.01)
*G05F 1/618* (2006.01)

(52) U.S. Cl.
CPC ............... *G05F 1/462* (2013.01); *G05F 1/618* (2013.01); *H02M 1/12* (2013.01)

(58) Field of Classification Search
None
See application file for complete search history.

(56) References Cited

U.S. PATENT DOCUMENTS

| | | | |
|---|---|---|---|
| 5,929,620 A * | 7/1999 | Dobkin et al. | 323/288 |
| 6,362,986 B1 | 3/2002 | Schultz et al. | |
| 7,239,530 B1 | 7/2007 | Djekic et al. | |
| 7,362,191 B2 * | 4/2008 | Chen et al. | 331/78 |
| 2014/0055117 A1 * | 2/2014 | Elwan et al. | 323/311 |

* cited by examiner

*Primary Examiner* — Timothy J Dole
*Assistant Examiner* — Ishrat Jamali
(74) *Attorney, Agent, or Firm* — Lathrop & Gage LLP

(57) ABSTRACT

A controller for a DC-to-DC converter includes a control signal generator and an oscillation prevention subsystem. The control signal generator is adapted to control one or more switching circuits of the DC-to-DC converter such that the DC-to-DC converter transfers power from an input power source to a load. The oscillation prevention subsystem is adapted to shift a switching frequency of the DC-to-DC converter away from a frequency of an alternating current component of a load current flowing between the DC-to-DC converter and the load.

20 Claims, 5 Drawing Sheets

DC-TO-DC CONVERTER CONTROLLERS INCLUDING OSCILLATION PREVENTION SUBSYSTEMS, AND ASSOCIATED SYSTEMS AND METHODS

BACKGROUND

Many direct current to direct current (DC-to-DC) converters make use of the "buck" or the "multi-phase buck" topology. These topologies are illustrated in FIG. 1. In a single or multi-phase buck converter 100, a switching device 102 repeatedly couples a driven end of an inductor 104 to an input power source 106 at a given frequency referred to as the converter's switching frequency. This coupling causes a current to build up through inductor 104 between a converter output 108 and power source 106. When switching device 102 opens, inductor current continues to flow for a time, typically through either or both of a diode 110 and a second switching device 112, and thence into a load 114. If second switching device 112 is a transistor, diode 110 may be a body diode of the transistor. Accordingly, inductor 104 may be referred to as an energy storage inductor, and diode 110 and second switching device 112 couple energy stored in inductor 104 to load 114. A bypass or filtering capacitor 116 is typically provided to reduce ripple by smoothing voltage provided to load 114, and an input capacitor 117 is typically coupled across input power source 106 to supply the converter's ripple current requirements. A variable-resistor symbol is used to represent load 114 because effective load resistance may change during operation. Voltage provided to the load 114 and/or another converter parameter is typically sensed by a controller 120 that provides for control and drive of the switching devices 102 and 112; for simplicity of illustration connections between controller 120 and switching devices are not shown. The switching devices are selected by a designer from transistors deemed to be good for switching regulators such as MOS (including CMOS & LDMOS), Gallium Arsenide and Bipolar transistors, and such other electronic switching devices such as gate-turnoff thyristors as known in the art of electronics.

In order to provide for high current capability and reduce ripple, one or more additional phases may be provided to extend the design into a multi-phase converter design, where each phase adds an additional switching device, such as switching device 122, diode 124 and/or second switching device 126, and inductor 128 to the design. These switching devices 122, 126 also operate under control of controller 120, and are typically timed to reduce ripple such that device 122 and device 102 do not turn on simultaneously, although they both may be on simultaneously. The timing relationship between turn-on of devices 122, 102 within a converter cycle is a phasing, or a phase relationship between the primary and additional phases of the multi-phase converter.

Multi-phase DC-to-DC converters may be designed without magnetic coupling between the inductors 104 and 128 of different phases, or may be designed with specific coupling between the inductors of different phases as described in U.S. Pat. No. 6,362,986 to Schultz, et al., the disclosure of which is incorporated herein by reference.

Multi-phase DC-to-DC converters can be used in many applications including digital and analog IC chips, such as to provide bias power supplies for the chips. One challenging example is for a power supply to high performance microprocessors. Modern processor integrated circuits often require very low operating voltages, such as voltages at predetermined levels from around one to two and a half volts, and may require very high currents of as much as hundreds of amperes.

Further, these processors are often designed with power-saving circuitry that can save considerable power by disabling functional units when those units not needed, but can cause current demand to soar dramatically over very short periods of time as functional units within the processor are enabled when needed. For example, current demand by some processors may jump by at least 100 amperes within a microsecond, effective load 114 resistance changing sharply between values in the ranges of ohms or tenths of ohms and values on the order of less than a hundredth of an ohm. These processors therefore impose stringent requirements on their associated power supply systems. Typically, these processors are powered from five or twelve volt power supplies thus requiring step-down DC-to-DC converters such as multi-phase buck converters, and large filtering capacitors 116 are provided to allow for load current changes.

Many DC-to-DC converter applications require a voltage step-up rather than the step-down provided by the buck converter of FIG. 1. Many other architectures for single and multiple-phase converters exist that can meet such requirements.

Among those DC-to-DC converter architectures that are capable of providing a voltage step up, the most common is the boost converter, single-phase boost converters have been used for many years in such applications as powering the cathode-ray tube of television receivers. FIG. 2 illustrates a multi-phase boost converter 200, having an inductor 202, 204 associated with each phase. Each phase also has at least one switching device, represented by switch 206, and a diode 208. A second switching device, represented as switch 210, may be provided to bypass forward voltage drop of the diode 208; diode 208 and switch 210 together couple energy from inductor 202 to load filter capacitor 212 following each turnoff of switch 206. A controller 214, which may operate under feedback control by sensing load voltage and/or another converter parameter, is provided for driving switching devices 206, 210.

SUMMARY

In an embodiment, a controller for a DC-to-DC converter includes a control signal generator and an oscillation prevention subsystem. The control signal generator is adapted to control one or more switching circuits of the DC-to-DC converter such that the DC-to-DC converter transfers power from an input power source to a load. The oscillation prevention subsystem is adapted to shift the switching frequency of the DC-to-DC converter away from a frequency of an alternating current component of a load current flowing between the DC-to-DC converter and the load.

In an embodiment, a DC-to-DC converter includes one or more switching circuits, a respective energy storage inductor electrically coupled to each of the one or more switching circuits, and a controller. The controller includes a control signal generator and an oscillation prevention subsystem. The control signal generator is adapted to control the one or more switching circuits to transfer power from an input power source to a load. The oscillation prevention subsystem is adapted to shift a switching frequency of the DC-to-DC converter away from a frequency of an alternating current component of a load current flowing between the DC-to-DC converter and the load.

In an embodiment, a method for reducing beat frequency oscillation in a DC-to-DC converter includes the following steps: (a) detecting an alternating current component of a load current of the DC-to-DC converter; (b) detecting whether the alternating current component has a frequency within a predetermined proximity to a baseline switching frequency of the DC-to-DC converter; and (c) in response to detecting that the load current includes the alternating current component within the predetermined proximity to the baseline switching frequency, shifting a switching frequency of the DC-to-DC converter from the baseline switching frequency to an alternative switching frequency, the alternative switching frequency being different than the baseline switching frequency.

DETAILED DESCRIPTION OF THE EMBODIMENTS

DC-to-DC converters are sometimes used in applications where the load current includes one or more alternating current (AC) components, in addition to a DC component. For example, a microprocessor may draw current having a high frequency AC component superimposed on a DC component. Beat frequency oscillation may occur if the AC component's frequency is close to the DC-to-DC converter's switching frequency, or an integer multiple of the DC-to-DC converter's switching frequency. Beat frequency oscillation may cause phase current imbalance in multi-phase DC-to-DC converters, such that some phases carry significantly more current than other phases. Phase current imbalance, in turn, may cause adverse effects like magnetic device saturation and/or overheating of phases carrying large currents. Phase current imbalance may also negate ripple current cancellation in multi-phase DC-to-DC converters, potentially causing excessive ripple current magnitude and corresponding high ripple voltage magnitude. Accordingly, beat frequency oscillation can be problematic in DC-to-DC converters.

Applicant has discovered that beat frequency oscillation can be reduced, or even essentially eliminated, by detecting when an AC component of the load current has a frequency close to the converter's switching frequency, or a harmonic thereof, and in response, shifting the converter's switching frequency, such that the switching frequency, or a harmonic thereof, is away from the AC component's frequency. Such shifting distances the switching frequency or its harmonics from the AC component's frequency, thereby reducing, or even essentially eliminating, interaction of the AC component with the switching frequency and its harmonics.

Figure 1:
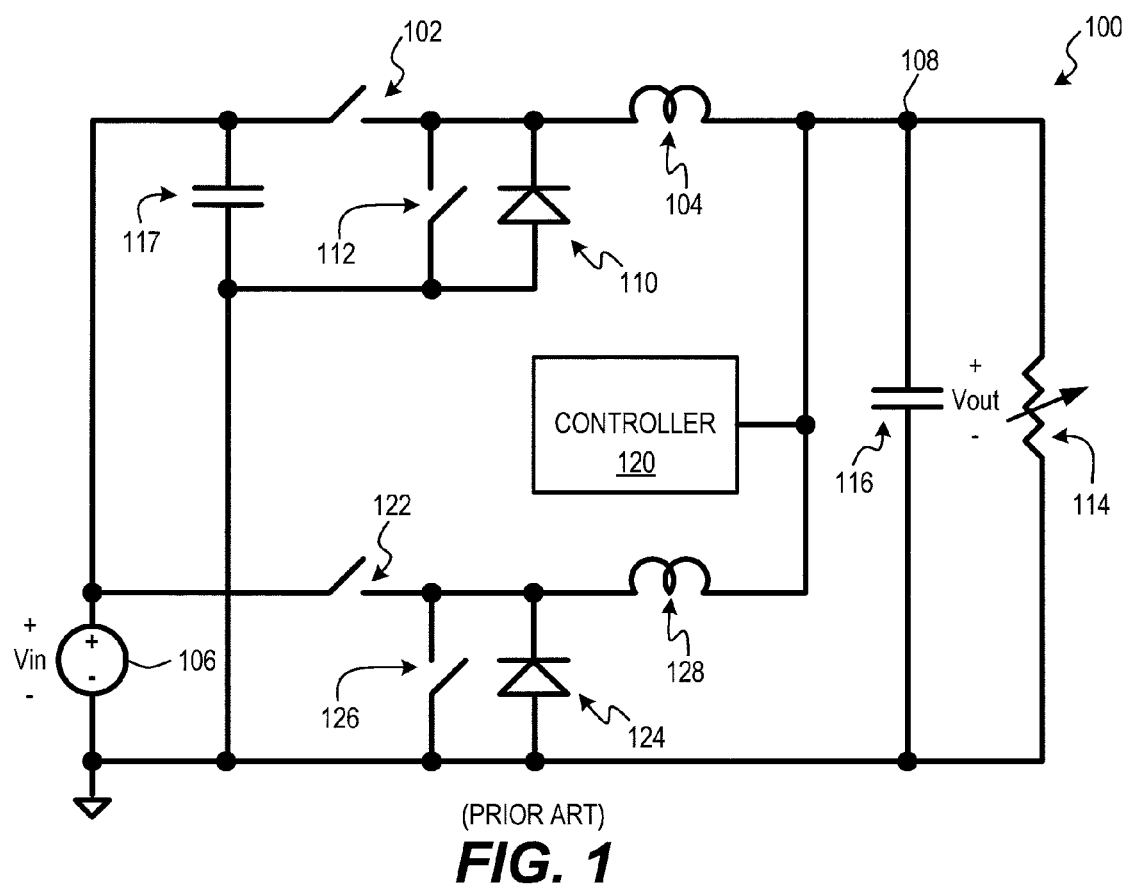
FIG. 1 illustrates a prior art buck converter.
Figure 2:
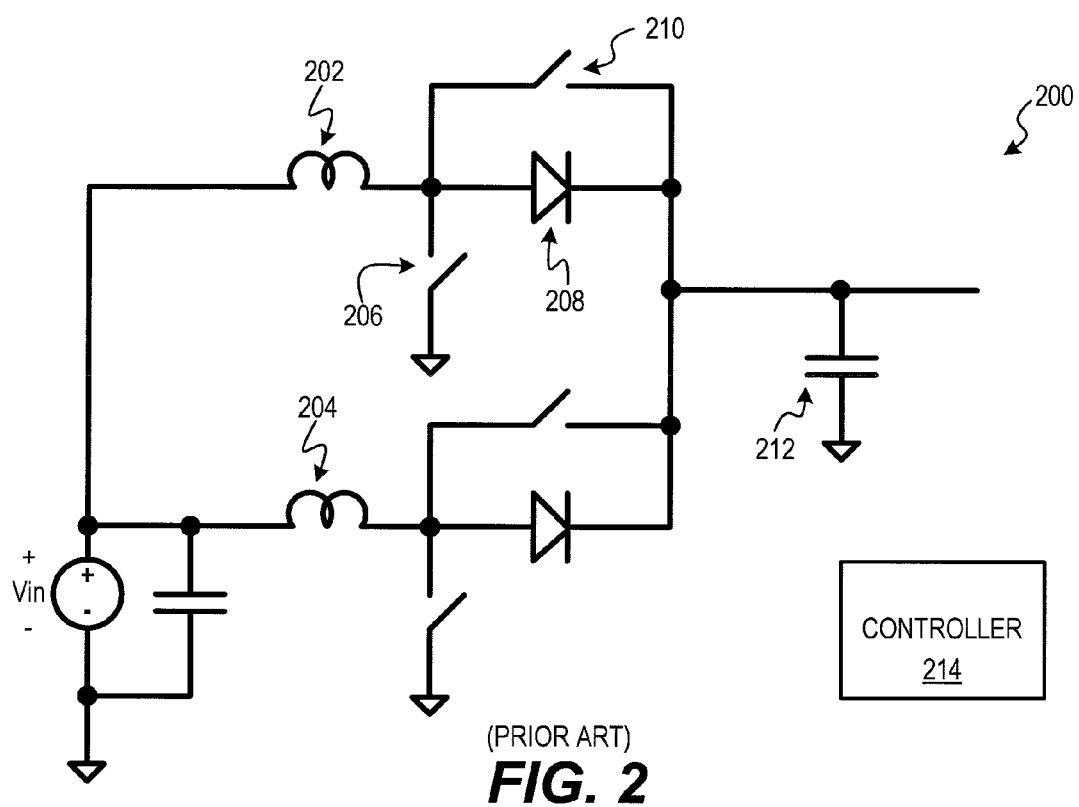
FIG. 2 illustrates a prior art boost converter.
Figure 3:
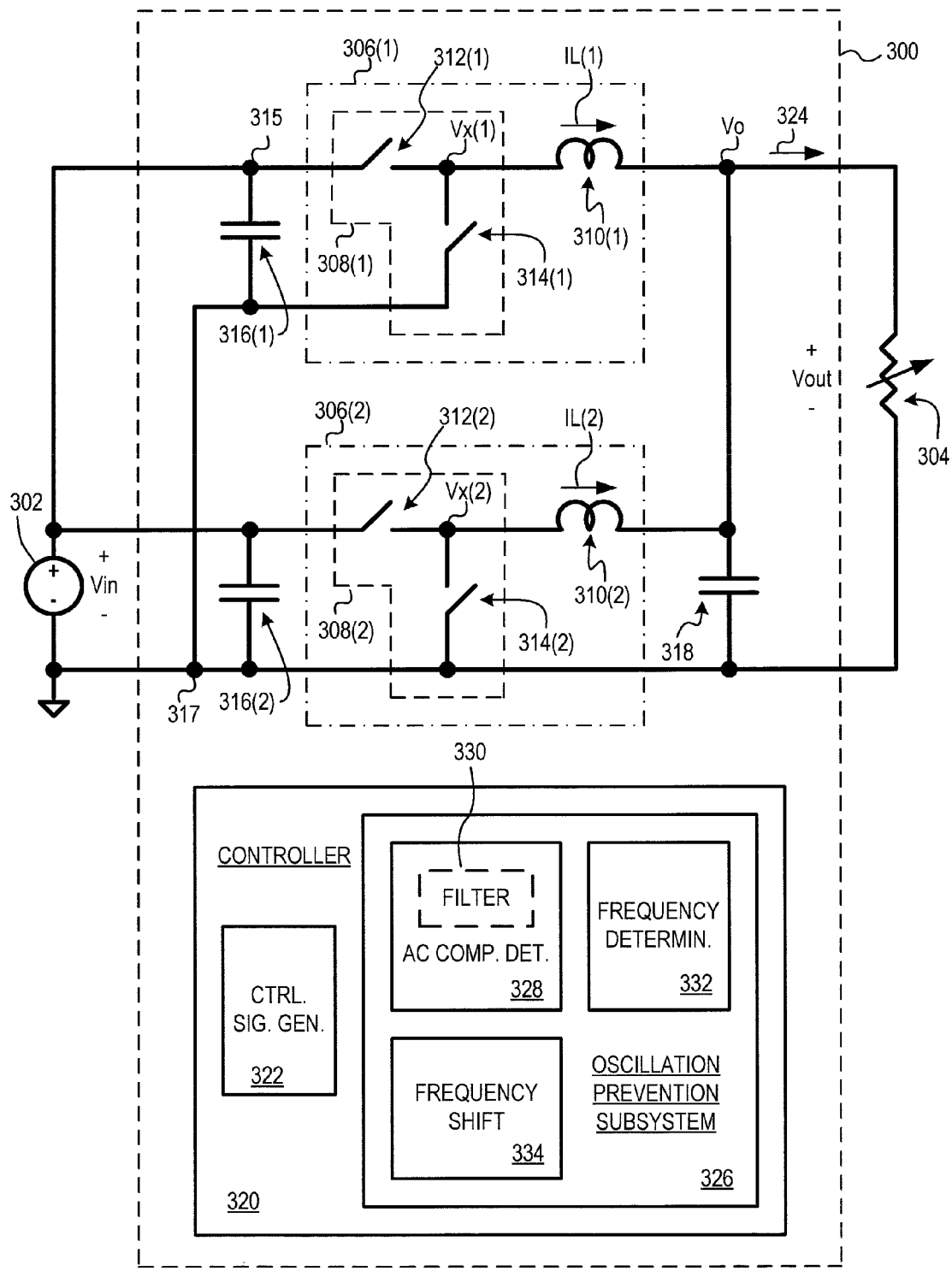
FIG. 3 illustrates a DC-to-DC converter including an oscillation prevention subsystem for reducing beat frequency oscillation, according to an embodiment.

FIG. 3 illustrates a DC-to-DC converter 300 including an oscillation prevention subsystem for reducing beat frequency oscillation. Converter 300 is a buck-type DC-to-DC converter which transfers power from an input power source 302 to a load 304. Converter 300 includes one or more phases 306. Although converter 300 is shown having two phases 306, converter 300 could have a different numbers of phases without departing from the scope hereof. Thus, converter 300 can be described as having N phases, where N is an integer greater than or equal to one. In this document, specific instances of an item may be referred to by use of a numeral in parentheses (e.g., phase 306(1)) while numerals without parentheses refer to any such item (e.g., phases 306). Each phase 306 includes a switching circuit 308 electrically coupled to a respective energy storage inductor 310. In certain embodiments, two or more of inductors 310 are magnetically coupled to improve converter performance relative to a converter with discrete, uncoupled, inductors 310.

Each switching circuit 308 includes a high side switching device 312 and a low side switching device 314 electrically coupled at a switching node Vx. The high side switching device 312 and energy storage inductor 310 of each phase 306 are electrically coupled in series between a positive input node 315 and an output node Vo. The low side switching device 314 of each phase 306 is electrically coupled between the switching node Vx of the phase and a reference node 317. At least one input capacitor 316 is electrically coupled between nodes 315, 317 to supply ripple current to converter 300, and at least one output capacitor 318 is electrically coupled between nodes Vo, 317 to filter ripple current from DC-to-DC converter 300 and to help support transient loads.

DC-to-DC converter 300 further includes a controller 320 implemented, for example, by a combination of digital and analog circuitry. In some embodiments, controller 320 is partially implemented by a processor executing instructions in the form of software or firmware. Controller 320 includes a control signal generator 322 which generates control signals, which in an embodiment include pulse width modulation (PWM) signals or pulse frequency modulation (PFM) signals, for controlling switching devices 312, 314. For simplicity of illustration, connections between controller 320 and switching circuits 308 are not shown. Control signal generator 322 causes each switching circuit 308 to repeatedly switch its respective switching node Vx between nodes 315, 317, thereby switching node Vx between two different voltage levels, to transfer power from input power source 302 to load 304. Control signal generator 322 typically causes switching circuits 308 to switch at a frequency of at least 50 KHz, such as in the range of 300 kHz to 1 MHz, to minimize ripple, to promote fast transient response, and to cause the converter to operate at a frequency range outside of that perceivable by humans. Switching frequency is selected, for example, to achieve a desired compromise between minimizing filtering requirements of output capacitor 318 and maximizing DC-to-DC converter 300 efficiency. Additionally, control signal generator 322 is typically configured to cause switching circuits 308 to switch out-of-phase with respect to each other, to achieve ripple current cancellation and fast transient response. In some embodiments, control signal generator 322 controls switching circuits 308 to regulate one or more converter parameters, such as input voltage (Vin), input current, input power, output voltage (Vout), load current 324, and/or output power.

Switching devices 312, 314, for example, include one or more transistors. In the embodiment of FIG. 3, high side switching device 312 is a control switching device in that Vout is a function of the switching device's duty cycle. Low side switching device 314 is a freewheeling device in that it provides a path for inductor current IL when the control switching device turns off. Thus, low side switching device 314 couples energy stored in inductor 310 to output node Vo. In some embodiments, low side switching device 314 is replaced with or supplemented by a diode. Load 304 draws load current 324. Load current 324 typically includes a DC component and may sometimes include one or more AC components.

Controller 320 further includes an oscillation prevention subsystem 326, which identifies an AC component of load current 324 having a frequency close to the converter's switching frequency, and in response, shifts the switching frequency away from the AC component's frequency. Furthermore, in some embodiments, oscillation prevention subsystem 326 is further capable of identifying an AC component of load current 324 having a frequency close to a harmonic (integer multiple) of the converter's switching frequency, and in response, shifting the switching frequency such that the harmonic of the converter's switching frequency is away from AC component's frequency.

Subsystem 326 includes an AC component detection module 328, which detects presence of an AC component of load current 324. In some embodiments, AC component detection module 328 includes a minimum threshold filter 330, such that AC component detection module 328 only detects AC components having a magnitude exceeding a predetermined minimum threshold value. Small magnitude AC components are unlikely to cause significant beat frequency oscillation, and therefore, small magnitude AC components may typically be ignored without significant adverse effect.

Oscillation prevention subsystem 326 further includes a frequency determination module 332 which determines whether the AC component detected by module 328 has a frequency within a predetermined proximity to the converter's baseline switching frequency. Additionally, in some embodiments, frequency determination module 332 further determines whether the AC component detected by module 328 is within a predetermined proximity to a harmonic of the baseline switching frequency, such as the second harmonic of the baseline switching frequency. The baseline switching frequency is converter 300's switching frequency when the switching frequency has not been shifted by oscillation prevention subsystem 326. Stated differently, converter 300 operates at its baseline switching frequency absent intervention by oscillation prevention subsystem 326. In some embodiments, frequency determination module 332 determines that the AC component's frequency is within the predetermined proximity to the baseline switching frequency, or a harmonic thereof, if the AC component's frequency is within one or more predetermined frequency windows.

For example, in certain embodiments, frequency determination module 332 determines whether the AC component's frequency is within either a first or second frequency window W1, W2. First frequency window W1 encompasses a frequency range proximate to the baseline switching frequency, and second frequency window W2 encompasses a frequency range proximate to the second harmonic of the baseline switching frequency. In one particular embodiment, the first frequency window is bounded by lower and upper frequencies F1_low and F1_high, respectively, and the second frequency window is bounded by lower and upper frequencies F2_low and F2_high, respectively. In this embodiment, the lower and upper frequencies are as follows, where F_sw is the baseline switching frequency:

$$F1\_low = (0.9) * (Fs\_sw) \qquad \text{EQN. 1}$$

$$F1\_high = (1.1) * (Fs\_sw) \qquad \text{EQN. 2}$$

$$F2\_low = (0.85) * (2) * (Fs\_sw) \qquad \text{EQN. 3}$$

$$F2\_high = (1.15) * (2) * (Fs\_sw) \qquad \text{EQN. 4}$$

Figure 4:
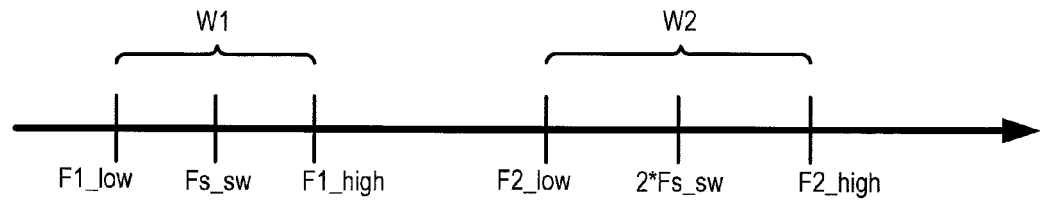
FIG. 4 graphically illustrates first and second frequency windows that are monitored for alternating current components, in certain embodiments of the FIG. 3 DC-to-DC converter.

FIG. 4 graphically illustrates first and second frequency windows W1, W2 when implemented according to EQNS. 1-4. In certain alternate embodiments, F1_low is 85% of Fs_sw, and F2_high is 115% of Fs_sw.

In some embodiments, frequency determination module 332 further determines whether the AC component's frequency is within a third frequency window W3, which encompasses a frequency range proximate to the third harmonic of the baseline switching frequency. The third frequency window is bounded by lower and upper frequencies F3_low and F3_high, respectively, which as are defined, for example, as follows:

$$F3\_low = (0.85) * (3) * (Fs\_sw) \qquad \text{EQN. 5}$$

$$F3\_high = (1.15) * (3) * (Fs\_sw) \qquad \text{EQN. 6}$$

Oscillation prevention subsystem 320 further includes a frequency shift module 334 which shifts converter 300's operating frequency from the baseline switching frequency to an alternative switching frequency, in response to frequency determination module 332 determining that the AC component's frequency is within the predetermined proximity to the converter's baseline switching frequency, or a harmonic thereof. The alternative switching frequency is different from the baseline switching frequency, and in one embodiment, the alternative switching frequency is 128 percent of the baseline switching frequency. The alternative switching frequency is typically a non-integer multiple of the baseline switching frequency, to minimize interaction of harmonics of AC component's frequency with harmonics of the baseline switching frequency. Although it is anticipated that the alternative switching frequency will usually be greater than the baseline switching frequency to promote control system stability, in some embodiments, the alternative switching frequency could instead be lower than the baseline switching frequency if adequate steps are taken to achieve system stability.

Oscillation prevention subsystem 326 continues to determine whether alternative switching frequency operation is appropriate after DC-to-DC converter 300's switching frequency has been shifted from the baseline switching frequency to the alternative switching frequency. Specifically, AC component detection module 328 continues to detect whether load current 324 includes an AC component, and in embodiments including minimum threshold filter 330, whether the AC component has a magnitude exceeding the predetermined minimum threshold value. Additionally, frequency determination module 332 continues to determine whether an AC component detected by module 328 has a frequency within a predetermined proximity to the converter's baseline switching frequency. In embodiments where frequency determination module 332 further determines whether the AC component detected by module 328 is within a predetermined proximity to a harmonic of the baseline switching frequency, module 328 also continues to make such determinations. If module 328 no longer detects that load current 324 includes an AC component, or if no AC component has a magnitude exceeding the predetermined minimum threshold value, frequency shift module 334 causes converter 300 to shift from its alternative switching frequency back to its baseline switching frequency. Additionally, if module 332 determines that the AC component's frequency is no longer within the predetermined proximity to the baseline switching frequency, or a harmonic thereof, frequency shift module 334 causes converter 300 to shift from its alternative switching frequency back to its baseline switching frequency.

Although modules 328, 332, and 334 are illustrated as being separate modules, one or more of these modules may be partially or completely combined. Additionally, some or all of oscillation prevention subsystem 326 could be combined with control signal generator 322 without departing from the scope hereof. For example, in one alternative embodiment, the functionality of frequency shift module 334 is implemented by control signal generator 322, instead of by a module within oscillation prevent subsystem 326.

Figure 5:
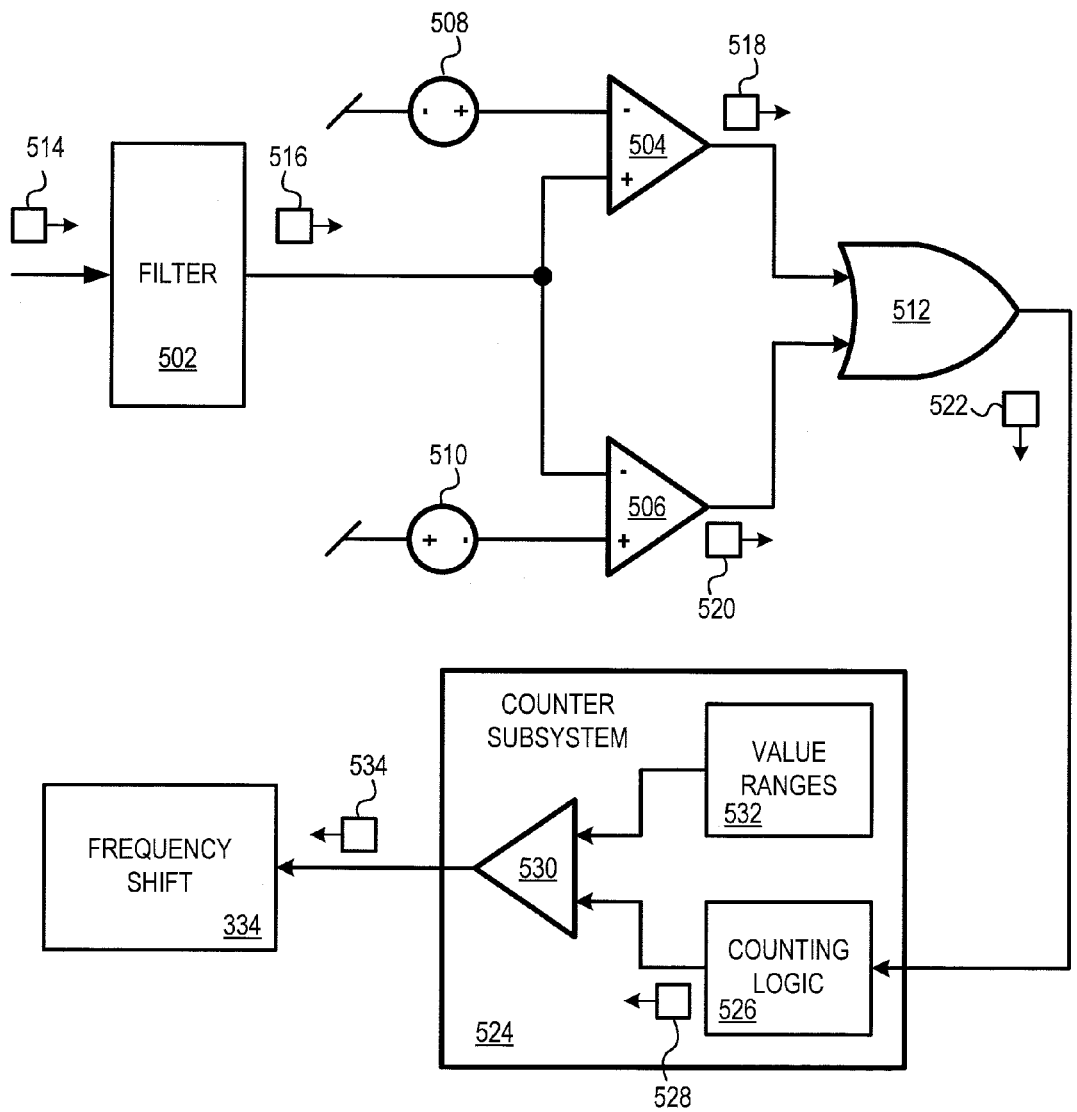
FIG. 5 shows one possible implementation of the oscillation prevention subsystem of the FIG. 3 DC-to-DC converter, according to an embodiment.

FIG. 5 shows possible implementation of oscillation prevention subsystem 326. It should be appreciated, however, that subsystem 326 could be implemented in a different manner, without departing from the scope hereof.

A filter 502, first and second comparators 504, 506, first and second references 508, 510, and a signal combiner 512 collectively implement AC component detection module 328, in the FIG. 5 implementation. Filter 502 receives a differential signal 514 representing load current 324. In some embodiments, signal 514 is a direct representation of load current 324, such as a signal obtained by sensing load current 324. In some other embodiments, signal 514 is a signal representing a desired load current 324, such that signal 514 indirectly represents load current 324. Filter 502 removes the DC component and low frequency AC components of signal 514, to generate a filtered current signal 516. Thus, filtered current signal 516 represents high frequency components of load current 324.

First comparator 504 asserts a first signal 518 when filtered current signal 516 exceeds first reference 508, and second comparator 506 asserts a second signal 520 when filtered current signal 516 is less than second reference 510. Signal combiner 512, which for example is an OR gate or logic providing similar functionality, combines first and second signals 518, 520 to assert a high frequency detection signal 522 whenever either first or second signal 518, 520 is asserted. Thus, high frequency detection signal 522 is asserted in response to positive and negative pulses of load current 324. References 508, 510 implement minimum threshold filter 330 by preventing comparators 504, 506 from detecting low magnitude pulses. The frequency of signal 522 is twice the frequency of the load current AC component because high frequency detection signal 522 is asserted every time load current 324 rises and falls below the threshold values. In some embodiments, signal combiner 512 asserts high frequency detection signal 522 only when first and second signals 518, 520 are alternatively asserted, such as only when second signal 520 is asserted within a predetermined amount of time after first signal 518 is asserted, or only when first signal 518 is asserted within a predetermined amount of time after second signal 520 is asserted.

A counter subsystem 524, which implements frequency determination module 332 in the FIG. 5 implementation, includes counting logic 526 which outputs a signal 528 representing the number of times high frequency detection signal 522 is asserted within a given sampling time period, thereby representing a number of pulse of the AC component within the sampling time period. In some embodiments, the sampling time period is a predetermined number of converter switching cycles, such as eight converter switching cycles. In these embodiments, the number of converter switching cycles of each sampling time period is adjusted according to whether the DC-to-DC converter is operating at its baseline or alternative switching frequency, to maintain a constant sampling time period as switching frequency changes. Comparing logic 530 then compares signal 528 to one or more predetermined value ranges 532, and comparing logic 530 asserts a shift signal 534 if signal 528 is within any of value ranges 532. Each value range 532 defines a range of signal 528 values corresponding to a respective frequency window. For example, one embodiment includes a first value range 532(1) and a second frequency range 532(2) corresponding to first and second frequency windows, respectively. In this embodiment, first value range 532(1) encompasses signal 528 values of 7 and 8, and second value range 532(2) encompasses signal 528 values ranging from 13 to 17. Comparing logic 530 then de-asserts signal shift signal 534 when signal 528 is no longer within any of value ranges 532.

Frequency shift module 334 causes converter 300 to shift from its baseline switching frequency to its alternative switching frequency in response to assertion of signal 534. Additionally, frequency shift module 334 causes converter 300 to shift from its alternative switching frequency back to its baseline switching frequency in response to de-assertion of signal 534.

DC-to-DC converter 300 could be modified to have a different topology without departing from the scope hereof. For example, although converter 300 is shown having a standard buck-type topology where high side switching devices 312 are control switches, converter 300 could be modified to have an inverted buck-type topology where low side switching devices 314 are control switches. Converter 300 could also be modified to have a different DC-to-DC converter topology such as a boost-type topology, a buck-boost-type topology, or an isolated topology, with or without magnetically coupled energy storage inductors. Some examples of isolated DC-to-DC converter topologies including coupled energy storage inductors are disclosed in U.S. Pat. No. 7,239,530 to Djekic et al., which is incorporated herein by reference. As another example, although FIG. 3 shows each phase 306 electrically coupled to common input power source 302, two or more of phases 306 could be electrically coupled to different input power sources.

Figure 6:
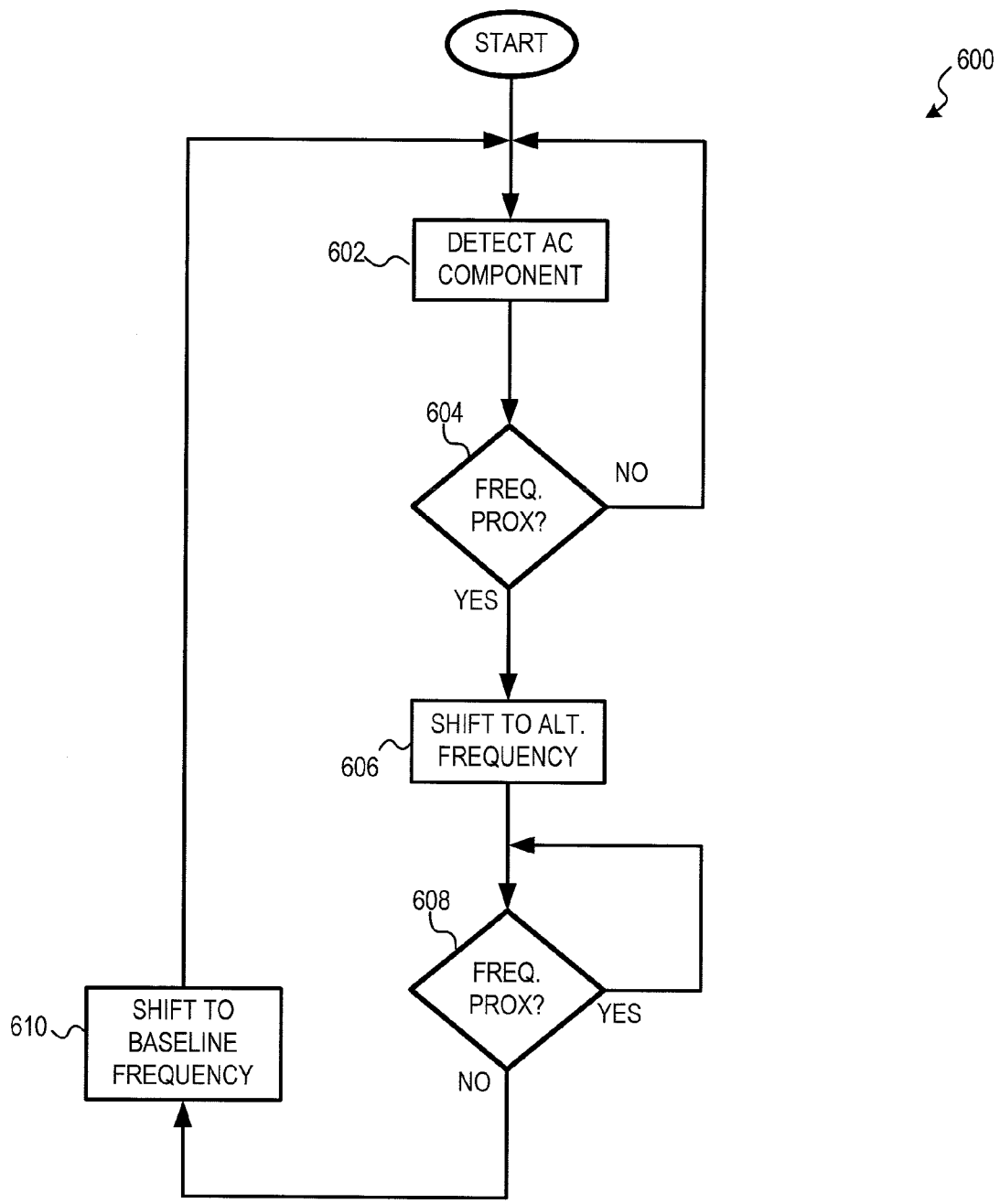
FIG. 6 shows one method for reducing beat frequency oscillation in a DC-to-DC converter, according to an embodiment.

FIG. 6 shows one method 600 for reducing beat frequency oscillation in a DC-to-DC converter. Although method 600 is discussed below with respect to DC-to-DC converter 300 of FIG. 3, method 600 could alternately be used with other DC-to-DC converters, such as a converter having a boost-type topology, without departing from the scope hereof.

Method 600 begins with step 602 of detecting an AC component of a load current of the DC-to-DC converter. In one example of step 602, AC component detection module 328 detects an AC component of load current 324. Decision step 604 determines whether a frequency of the AC component detected in step 602 is within a predetermined proximity to the converter's baseline switching frequency. If so, the method proceeds to step 606 where the switching frequency of the converter is shifted from the baseline switching frequency to an alternative switching frequency. If not, the method returns to step 602 to detect another AC component. In one example of steps 604 and 604, frequency determination module 332 determines that the AC component is within frequency window W1 and in response, frequency shift module 334 shifts converter 300's switching frequency from its baseline switching frequency to its alternative switching frequency.

Method 600 proceeds from step 606 to decision step 608 to determine whether the switching frequency of the AC component is still within the predetermined proximity to the converter's baseline switching frequency. If so, operation at the alternative switching frequency is still appropriate, and decision step 608 repeats without changing the converter's switching frequency. On the other hand, if the result of decision step 608 is no, the method proceeds to step 610, where the converter's switching frequency is shifted from its alternative switching frequency back to its baseline switching frequency. In one example of steps 608 and 610, frequency determination module 332 determines that the AC component is no longer within frequency window W1, and in response, frequency shift module 334 shifts converter 300's switching frequency from its alternative switching frequency back to its baseline switching frequency.

Combinations of Features

Features described above as well as those claimed below may be combined in various ways without departing from the scope hereof. The following examples illustrate some possible combinations:

(A1) A controller for a DC-to-DC converter may include (1) a control signal generator adapted to control one or more switching circuits of the DC-to-DC converter such that the DC-to-DC converter transfers power from an input power source to a load; and (2) an oscillation prevention subsystem adapted to shift a switching frequency of the DC-to-DC converter away from a frequency of an alternating current (AC) component of a load current flowing between the DC-to-DC converter and the load.

(A2) In the controller denoted as (A1), the oscillation prevention subsystem may include (1) an AC component detection module adapted to detect the AC component of the load current; (2) a frequency determination module adapted to determine whether the AC component has a frequency within a predetermined proximity to a baseline switching frequency of the DC-to-DC converter; and (3) a frequency shift module adapted to shift the switching frequency of the DC-to-DC converter from the baseline switching frequency to an alternative switching frequency, in response to determining that the frequency of the AC component is within the predetermined proximity to the baseline switching frequency.

(A3) In the controller denoted as (A2): (1) the frequency determination module may be further adapted to determine whether the AC component has a frequency within a predetermined proximity to a harmonic of the baseline switching frequency; and (2) the frequency shift module may be further adapted to shift the switching frequency of the DC-to-DC converter from the baseline switching frequency to the alternative switching frequency, in response to determining that the frequency of the AC component is within the predetermined proximity to the harmonic of the baseline switching frequency.

(A4) In the controller denoted as (A3), the harmonic of the baseline switching frequency may be a second harmonic of the baseline switching frequency.

(A5) In any of the controllers denoted as (A2) through (A4), the AC component detection module may be further adapted to detect the AC component only if a magnitude of the AC component exceeds a predetermined minimum threshold value.

(A6) In any of the controllers denoted as (A1) through (A5), the control signal generator may be further adapted to control the one or more switching circuits of the DC-to-DC converter to regulate one or more parameters selected from the group consisting of input voltage to the DC-to-DC converter, input current to the DC-to-DC converter, input power to the DC-to-DC converter, output voltage of the DC-to-DC converter, the load current, and output power of the DC-to-DC converter.

(B1) A DC-to-DC converter may include one or more switching circuits, a respective energy storage inductor electrically coupled to each of the one or more switching circuits, and a controller. The controller may include (1) a control signal generator adapted to control the one or more switching circuits to transfer power from an input power source to a load; and (2) an oscillation prevention subsystem adapted to shift a switching frequency of the DC-to-DC converter away from a frequency of an alternating current (AC) component of a load current flowing between the DC-to-DC converter and the load.

(B2) In the DC-to-DC converter denoted as (B1), the DC-to-DC converter may include a multi-phase buck-type converter.

(B3) In either of the DC-to-DC converters denoted as (B1) or (B2), the oscillation prevention subsystem may include (1) an AC component detection module adapted to detect the AC component of the load current; (2) a frequency determination module adapted to determine whether the AC component has a frequency within a predetermined proximity to a baseline switching frequency of the DC-to-DC converter; and (3) a frequency shift module adapted to shift the switching frequency of the DC-to-DC converter from the baseline switching frequency to an alternative switching frequency, in response to determining that the frequency of the AC component is within the predetermined proximity to the baseline switching frequency.

(B4) In the DC-to-DC converter denoted as (B3): (1) the frequency determination module may be further adapted to determine whether the AC component has a frequency within a predetermined proximity to a harmonic of the baseline switching frequency; and (2) the frequency shift module may be further adapted to shift the switching frequency of the DC-to-DC converter from the baseline switching frequency to the alternative switching frequency, in response to determining that the frequency of the AC component is within the predetermined proximity to the harmonic of the baseline switching frequency.

(B5) In the DC-to-DC converter denoted as (B4), the harmonic of the baseline switching frequency may be a second harmonic of the baseline switching frequency.

(B6) In any of the DC-to-DC converters denoted as (B3) through (B5), the alternative switching frequency may be a non-integer multiple of the baseline switching frequency.

(B7) In any of the DC-to-DC converters denoted as (B3) through (B6), the AC component detection module may be further adapted to detect the AC component of the load current only if a magnitude of the AC component exceeds a predetermined minimum threshold value.

(C1) A method for reducing beat frequency oscillation in a DC-to-DC converter may include (1) detecting an alternating current (AC) component of a load current of the DC-to-DC converter; (2) determining whether the AC component has a frequency within a predetermined proximity to a baseline switching frequency of the DC-to-DC converter; and (3) in response to determining that the AC component has a frequency within the predetermined proximity to the baseline switching frequency, shifting a switching frequency of the DC-to-DC converter from the baseline switching frequency to an alternative switching frequency, the alternative switching frequency being different than the baseline switching frequency.

(C2) The method denoted as (C1) may further include (1) determining whether the AC component has a frequency within a predetermined proximity to a harmonic of the baseline switching frequency; and (2) in response to determining that the AC component has a frequency within the predetermined proximity to the harmonic of the baseline switching frequency, shifting a switching frequency of the DC-to-DC converter from the baseline switching frequency to the alternative switching frequency.

(C3) Either of the methods denoted as (C1) or (C2) may further include detecting the AC component only if the AC component has a magnitude exceeding a minimum threshold value.

(C4) In any of the methods denoted as (C1) through (C3), the alternative switching frequency may be a non-integer multiple of the baseline switching frequency.

(C5) In any of the methods denoted as (C1) through (C4), the alternative switching frequency may be greater than the baseline switching frequency.

(C6) In any of the methods denoted as (C1) through (C5), the step of determining whether the AC component has a frequency within the predetermined proximity to the baseline switching frequency may include (1) counting a number of pulses of the AC component within a predetermined number of switching cycles of the DC-to-DC converter; and (2) determining that the AC component has a frequency within the predetermined proximity to the baseline switching frequency if the number of pulses is within a predetermined value range.

(C7) The method denoted as (C6) may further include varying the predetermined number of switching cycles according to whether the switching frequency of the DC-to-DC converter is the baseline switching frequency or the alternative switching frequency.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A controller for a DC-to-DC converter, comprising:
a control signal generator adapted to control one or more switching circuits of the DC-to-DC converter such that the DC-to-DC converter transfers power from an input power source to a load; and
an oscillation prevention subsystem adapted to shift a switching frequency of the DC-to-DC converter away from a frequency of an alternating current (AC) component of a load current flowing between the DC-to-DC converter and the load, the oscillation prevention subsystem including:
an AC component detection module adapted to detect the AC component of the load current from a signal representing the load current,
a frequency determination module adapted to determine whether the AC component has a frequency within a predetermined proximity to a baseline switching frequency of the DC-to-DC converter, and
a frequency shift module adapted to shift the switching frequency of the DC-to-DC converter from the baseline switching frequency to an alternative switching frequency, in response to determining that the frequency of the AC component is within the predetermined proximity to the baseline switching frequency.

2. The controller of claim 1, wherein:
the frequency determination module is further adapted to determine whether the AC component has a frequency within a predetermined proximity to a harmonic of the baseline switching frequency; and
the frequency shift module is further adapted to shift the switching frequency of the DC-to-DC converter from the baseline switching frequency to the alternative switching frequency, in response to determining that the frequency of the AC component is within the predetermined proximity to the harmonic of the baseline switching frequency.

3. The controller of claim 2, the harmonic of the baseline switching frequency being a second harmonic of the baseline switching frequency.

4. The controller of claim 1, the AC component detection module further adapted to detect the AC component only if a magnitude of the AC component exceeds a predetermined minimum threshold value.

5. The controller of claim 1, the control signal generator further adapted to control the one or more switching circuits of the DC-to-DC converter to regulate one or more parameters selected from the group consisting of input voltage to the DC-to-DC converter, input current to the DC-to-DC converter, input power to the DC-to-DC converter, output voltage of the DC-to-DC converter, the load current, and output power of the DC-to-DC converter.

6. The controller of claim 1, wherein:
the AC component detection module comprises:
a filter for filtering the signal representing the load current to generate a filtered current signal, and
circuitry for asserting a high frequency detection signal in response to a magnitude of a pulse of the filtered current signal exceeding a threshold value;
the frequency determination module comprises:
counting logic for generating a counting signal representing a number of the times that the high frequency detection signal is asserted within a given sampling time period, and
circuitry for asserting a frequency shift signal in response to the counting signal being within a predetermined range of values; and
the frequency shift module is adapted to shift the switching frequency of the DC-to-DC converter from the baseline switching frequency to the alternative switching frequency in response to assertion of the frequency shift signal.

7. A DC-to-DC converter, comprising:
one or more switching circuits;
a respective energy storage inductor electrically coupled to each of the one or more switching circuits; and
a controller, including:
a control signal generator adapted to control the one or more switching circuits to transfer power from an input power source to a load; and
an oscillation prevention subsystem adapted to shift a switching frequency of the DC-to-DC converter away from a frequency of an alternating current (AC) component of a load current flowing between the DC-to-DC converter and the load, the oscillation prevent subsystem including:
an AC component detection module adapted to detect the AC component of the load current from a signal representing the load current,
a frequency determination module adapted to determine whether the AC component has a frequency within a predetermined proximity to a baseline switching frequency of the DC-to-DC converter, and
a frequency shift module adapted to shift the switching frequency of the DC-to-DC converter from the baseline switching frequency to an alternative switching frequency, in response to determining that the frequency of the AC component is within the predetermined proximity to the baseline switching frequency.

8. The DC-to-DC converter of claim 7, the DC-to-DC converter comprising a multi-phase buck-type converter.

9. The DC-to-DC converter of claim 7, wherein:
the frequency determination module is further adapted to determine whether the AC component has a frequency within a predetermined proximity to a harmonic of the baseline switching frequency; and
the frequency shift module is further adapted to shift the switching frequency of the DC-to-DC converter from the baseline switching frequency to the alternative switching frequency, in response to determining that the frequency of the AC component is within the predetermined proximity to the harmonic of the baseline switching frequency.

10. The DC-to-DC converter of claim 9, the harmonic of the baseline switching frequency being a second harmonic of the baseline switching frequency.

11. The DC-to-DC converter of claim 7, the alternative switching frequency being a non-integer multiple of the baseline switching frequency.

12. The DC-to-DC converter of claim 7, the AC component detection module further adapted to detect the AC component of the load current only if a magnitude of the AC component exceeds a predetermined minimum threshold value.

13. The DC-to-DC converter of claim 7, wherein:
the AC component detection module comprises:
a filter for filtering the signal representing the load current to generate a filtered current signal, and
circuitry for asserting a high frequency detection signal in response to a magnitude of a pulse of the filtered current signal exceeding a threshold value;
the frequency determination module comprises:
counting logic for generating a counting signal representing a number of the times that the high frequency detection signal is asserted within a given sampling time period, and
circuitry for asserting a frequency shift signal in response to the counting signal being within a predetermined range of values; and
the frequency shift module is adapted to shift the switching frequency of the DC-to-DC converter from the baseline switching frequency to the alternative switching frequency in response to assertion of the frequency shift signal.

14. A method for reducing beat frequency oscillation in a DC-to-DC converter, comprising:
detecting an alternating current (AC) component of a load current of the DC-to-DC converter from a signal representing current flowing between the DC-to-DC converter and the load;
determining whether the AC component has a frequency within a predetermined proximity to a baseline switching frequency of the DC-to-DC converter; and
in response to determining that the AC component has a frequency within the predetermined proximity to the baseline switching frequency, shifting a switching frequency of the DC-to-DC converter from the baseline switching frequency to an alternative switching frequency, the alternative switching frequency being different than the baseline switching frequency.

15. The method of claim 14, further comprising:
determining whether the AC component has a frequency within a predetermined proximity to a harmonic of the baseline switching frequency; and
in response to determining that the AC component has a frequency within the predetermined proximity to the harmonic of the baseline switching frequency, shifting a switching frequency of the DC-to-DC converter from the baseline switching frequency to the alternative switching frequency.

16. The method of claim 14, further comprising detecting the AC component only if the AC component has a magnitude exceeding a minimum threshold value.

17. The method of claim 14, the alternative switching frequency being a non-integer multiple of the baseline switching frequency.

18. The method of claim 17, the alternative switching frequency being greater than the baseline switching frequency.

19. The method of claim 14, the step of determining whether the AC component has a frequency within the predetermined proximity to the baseline switching frequency comprising:
counting a number of pulses of the AC component within a predetermined number of switching cycles of the DC-to-DC converter; and
determining that the AC component has a frequency within the predetermined proximity to the baseline switching frequency if the number of pulses is within a predetermined value range.

20. The method of claim 19, further comprising varying the predetermined number of switching cycles according to whether the switching frequency of the DC-to-DC converter is the baseline switching frequency or the alternative switching frequency.

* * * * *